United States Patent Office 3,261,691
Patented July 19, 1966

3,261,691
SAFFLOWER OIL COMPOSITION
Roy Erickson, Deerfield, Ill., assignor to A. C. Grace Company, Northfield, Ill., a corporation of Illinois
No Drawing. Filed July 16, 1962, Ser. No. 210,203
5 Claims. (Cl. 99—118)

This invention relates to a composition of matter composed of safflower oil and ingredients employed in combination therewith to form a stable and clear solution without separation of any of the ingredients upon standing and which upon admixture with aqueous medium forms immediately into an emulsion which is stable and which is free of the usual oily consistency and taste.

In my copending application Ser. No. 19,521, filed April 4, 1960, entitled, "Emulsifiable Oil Concentrate," now abandoned, description is made of an emulsifiable mineral oil composition containing from 1.5 to 3.5 percent by weight of a polyoxyethylene derivative of oleic acid having from 6 to 8 molecules of ethylene oxide per molecule of oleic acid. The emulsifying agent is compatible in the mineral oil to form a stable solution which defies separation on standing and which is capable of causing immediate and complete emulsification of mineral oil in aqueous medium to form a composition in which the undesirable consistency and taste of mineral oil is completely avoided.

The concepts described and claimed in the foregoing copending application have been found not to be applicable for emulsification of a system wherein the oily component comprises safflower oil as distinguished from the mineral oil of the copending application. It has been found further that normal emulsifying agents usable with other oils are not effective in usable amounts to emulsify safflower oil. It is believed that the difference as between safflower oil and the mineral oil and such other oils stems from the high amount of polyunsaturation of the safflower oil by comparison with such other oils.

It is an object of this invention to produce a safflower oil composition containing ingredients in combination which enables immediate and complete emulsification of the safflower oil upon admixture with water or other aqueous medium and which in the concentrate prior to admixture with aqueous medium or emulsification provides a clear and stable solution in which little, if any, separation is evidenced.

A composition embodying the practice of this invention is illustrated by the following formulation:

*Example 1*

Emulsifiable safflower oil:

| Ingredient: | Percent by weight |
|---|---|
| Safflower oil | 97–98 |
| Glycerol monooleate | 1.4 |
| Sorbitan monooleate polyoxyethylene | 1.4 |

In preparation, the glycerol monooleate and the sorbitan monooleate polyoxyethylene are first combined prior to admixture with the safflower oil and they are preferably heated to a temperature sufficient to drive off water which otherwise would introduce an undesirable turbidity or cloudiness in the formulated composition.

Instead of glycerol monooleate, use can be made of other mono- and diglycerides of oleic acid. The amount of glycerol monooleate can be varied within the range of 1.2 to 1.5 percent by weight of the composition. The amount of sorbitan monooleate polyoxyethylene can range from 1.0 to 2.0 percent by weight of the composition and preferably from 1.2 to 1.5 percent by weight.

It is believed that synergism is present in the described composition since a suitable formulation with safflower oil cannot be secured with any one of the two additional ingredients. In fact, criticality is found to exist even in combination of the two ingredients which are combined with the safflower oil to produce a desirable, emulsifiable stable oil composition. Best results are secured when the glycerol monooleate and the sorbitan monooleate polyoxyethylene are present in the ratio of within the range of 40 parts by weight of the glycerol monooleate and 60 parts by weight of the other to 60 parts by weight of the glycerol monooleate and 40 parts by weight of the other and preferably when the two ingredients are present in about equal proportions by weight. When the ratio of one component over the other exceeds 60 parts by weight of one to 40 parts by weight of the other, the liquid concentrate evidences some instability by reason of the separation of the ingredients from solution upon standing and, but more important, the desired emulsification to form a stable system upon admixture with water or aqueous medium is not achieved.

Synergism in the combination of ingredients is also believed to be evidenced by reason of the inability to achieve the desired emulsification with any one of the ingredients when used alone at permissible levels. It has been found to be necessary to make use of at least 6 percent and up to 10 percent by weight of the sorbitan monooleate polyoxyethylene when used alone for emulsification of safflower oil. Such large amounts tend to impart a bitter taste to the composition and it exceeds the maximum which is permissible or desirable to be incorporated into food products. However, when used in combination with glycerol monooleate, the amount of the sorbitan monooleate polyoxyethylene can be reduced to 1.5 percent and below. Similar results have been experienced in the attempt to make use of glycerol monooleate alone but with the further difficulty in that a stable system and emulsion cannot be secured by the use of glycerol monooleate alone even when used in amounts greater than 6 to 10 percent by weight of the composition.

The following are given by way of further examples of compositions embodying the features of this invention:

*Example 2*

| Ingredient: | Percent by weight |
|---|---|
| Safflower oil | 97.6 |
| Glycerol monooleate | 1.3 |
| Sorbitan monooleate polyoxyethylene | 1.1 |

*Example 3*

| Ingredient: | Percent by weight |
|---|---|
| Safflower oil | 97.5 |
| Glycerol dioleate | 1.2 |
| Sorbitan monooleate polyoxythylene | 1.3 |

When it is desirable to make use of the concentrate of either of the Examples 1, 2 or 3, or others of the compositions embodying the features of this invention, the desirable amount of the concentrate is mixed with water, fruit juice, beverage or other aqueous medium and agitated to achieve immediate and direct emulsification of the safflower oil in the aqueous medium independent of the amount of dilution. The emulsified safflower oil is free of the oily taste and can be taken directly without difficulty or it can be used as the oil phase in the preparation of salad dressings or other food products whereby a stable system is continuously maintained.

The concentrate is a clear solution which remains clear upon standing over extended periods of time by reason of the complete compatibility of the ingredients in the unsaturated safflower oil.

It will be understood that changes may be made in the details of formulation without departing from the spirit of the invention, especially as defined in the following claims.

I claim:
1. A composition consisting essentially of safflower oil, 1.2 to 1.5 percent by weight of a compound selected from the group consisting of glycerol monooleate and glycerol dioleate, and 1.2 to 1.5 percent by weight of a sorbitan monooleate polyoxyethylene in which the glyceride of oleic acid and the sorbitan monooleate polyoxyethylene are present in the ratio of 40-60 parts by weight of one to 60-40 parts by weight of the other.

2. A composition consisting essentially of safflower oil, 1.2 to 1.5 percent by weight of a compound selected from the group consisting of glycerol monooleate and glycerol dioleate and 1.2 to 1.5 percent by weight of a sorbitan monooleate polyoxyethylene.

3. A composition consisting essentially of safflower oil, 1.2 to 1.5 percent by weight of glycerol monooleate and 1.0 to 2.0 percent by weight of a sorbitan monooleate polyoxyethylene in which the glycerol monooleate and the sorbitan monooleate polyoxyethylene are present within the ratio of 40-60 parts by weight of one to 60-40 parts by weight of the other.

4. A composition consisting essentially of safflower oil, 1.2 to 1.5 percent by weight glycerol monooleate and 1.2 to 1.5 percent by weight of a sorbitan monooleate polyoxyethylene.

5. The method of preparing an emulsifiable safflower oil comprising the steps of mixing glycerol monooleate and sorbitan monooleate polyoxyethylene in proportion within the range of 60-40 parts by weight of one to 40-60 parts by weight of the other, heating the mixture to remove water, and adding the mixture to safflower oil in an amount within the range of 2.4 to 3.0 percent by weight of the composition.

References Cited by the Examiner

UNITED STATES PATENTS 2,819,199  1/1958  Kalish _____ 99—118

OTHER REFERENCES

Atlas Powder Co., "Atlas Surface Active Agents," Wilmington, Del., 1948, pp. 20–70, pages 20 and 21 relied on.

Griffin, "The American Perfumer and Essential Oil Review," pp. 26–29, May 1955.

A. LOUIS MONACELL, *Primary Examiner.*

ABRAHAM H. WINKELSTEIN, M. W. GREENSTEIN, *Assistant Examiners.*